United States Patent [19]

Mueller et al.

[11] 4,132,178
[45] * Jan. 2, 1979

[54] SHELF AND CORNER POST COMBINATION

[75] Inventors: Floyd F. Mueller; William A. Gelbuda, both of Two Rivers, Wis.

[73] Assignee: American Hospital Supply Corporation, Evanston, Ill.

[*] Notice: The portion of the term of this patent subsequent to Jun. 22, 1993, has been disclaimed.

[21] Appl. No.: 652,482

[22] Filed: Jan. 26, 1976

Related U.S. Application Data

[63] Continuation-in-part of Ser. No. 576,038, May 9, 1975, Pat. No. 3,964,404.

[51] Int. Cl.² .................................................. A47B 9/08
[52] U.S. Cl. ................................... 108/144; 108/106; 248/188; 403/234; 403/240; 403/384
[58] Field of Search ................ 108/144, 156, 106, 96, 108/101, 110, 148; 248/219.1, 219.4, 221.1, 225.3, 225.4, 230, 245; 211/187, 192, 207, 208; 403/231, 234, 191, 384, 240

[56] References Cited

U.S. PATENT DOCUMENTS

| 844,754 | 2/1907 | Sardon | 248/245 X |
| 2,957,590 | 10/1960 | Armiger | 211/208 |
| 3,424,111 | 1/1969 | Maslow | 108/144 |
| 3,523,508 | 8/1970 | Maslow | 108/144 |
| 3,604,369 | 9/1971 | Maslow | 108/144 |
| 3,747,540 | 7/1973 | Salkoff et al. | 108/156 |
| 3,915,101 | 10/1975 | Onori | 108/106 X |
| 3,964,404 | 6/1976 | Mueller et al. | 108/144 |
| 3,981,250 | 9/1976 | Anthony | 108/144 |

Primary Examiner—Roy D. Frazier
Assistant Examiner—William E. Lyddane
Attorney, Agent, or Firm—Tilton, Fallon, Lungmus & Chestnut

[57] ABSTRACT

A shelf and corner post combination wherein the shelf is adjustable into any of a variety of selected elevations. Each of the posts is preferably cylindrical and is provided with a series of vertically-spaced indentations along at least one side thereof. The shelf includes a perimetric frame having adjacent side frame members which merge to define a corner section having an inside contour corresponding with that of the post. Each corner section has at least one inwardly-projecting horizontal rib adapted to seat in any selected indentation of the post. Different means are disclosed for drawing the rib into a selected indentation and for locking the parts in interfitting relationship.

23 Claims, 11 Drawing Figures

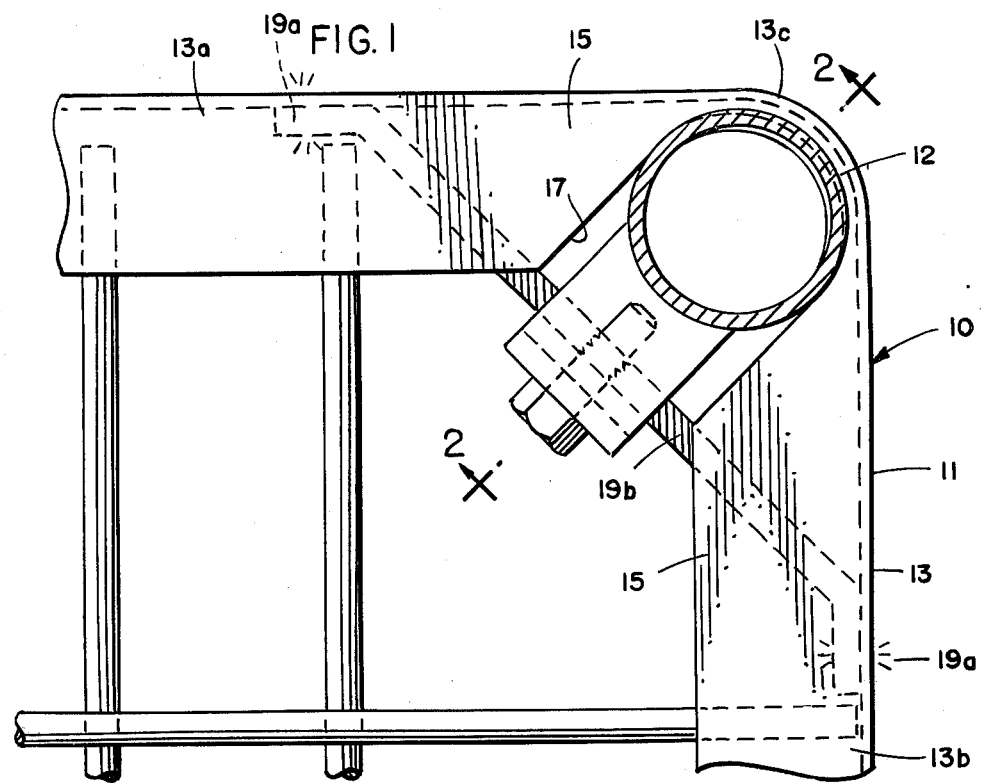
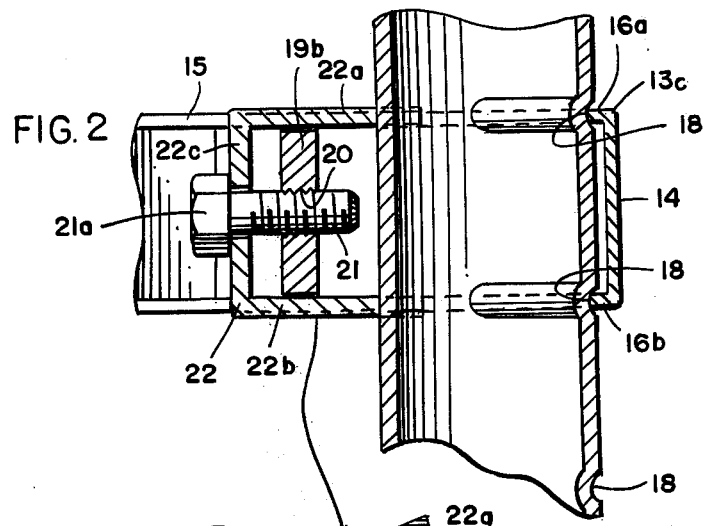
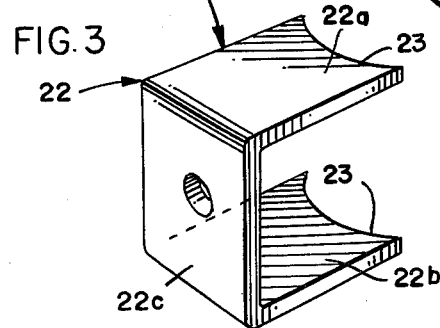

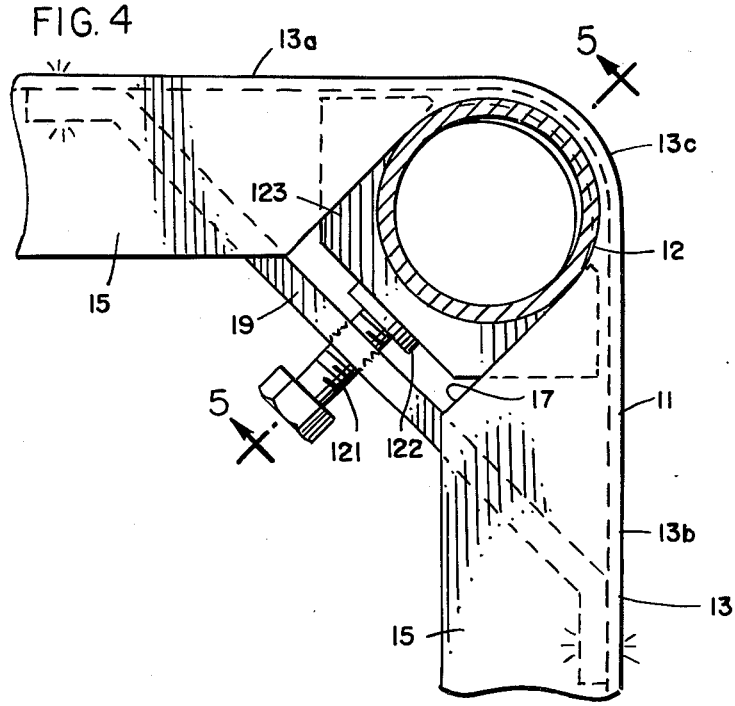
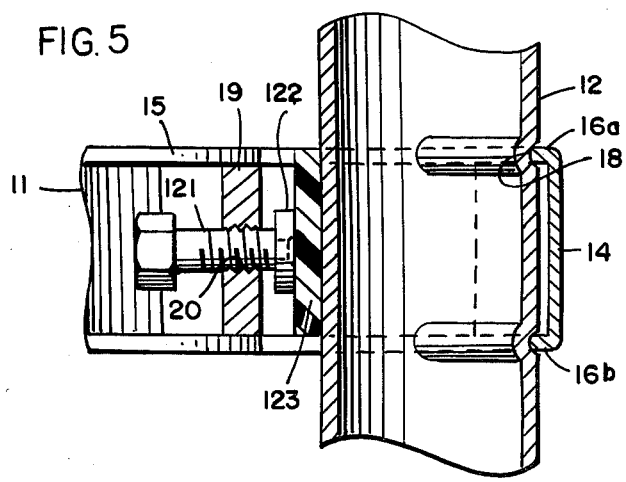
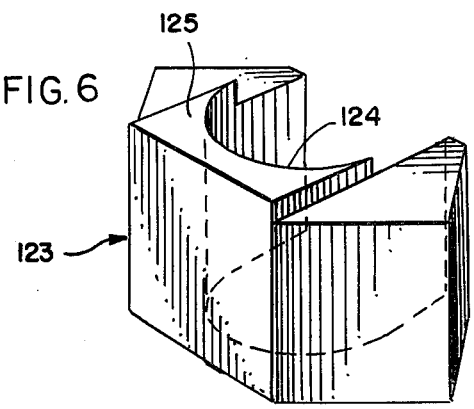

SHELF AND CORNER POST COMBINATION

RELATED APPLICATION

This application is a continuation-in-part of co-pending application Ser. No. 576,038, filed May 9, 1975, now U.S. Pat. No. 3,964,404.

BACKGROUND

Conventional adjustable metal shelving commonly includes set screws for anchoring the shelves at selected elevations. The screws are turned until they tightly engage the metal corner posts. Overtightening of the screws could damage the posts or, in some cases, strip the threads of the screws. On the other hand, should the screws be too loose, or should they become loosened during use, the stability of the entire structure could be affected and the equipment or articles supported by the loosened shelf could fall and become damaged. Furthermore, the set screw arrangement, while offering an advantage of infinite adjustability, also has the disadvantage of providing little or no indication of just when a shelf is level, thereby presenting a real possibility that such a shelf might be tightened while in a slightly tipped condition, with consequential effects on the alignment and stability of the assembly as a whole.

U.S. Pat. Nos. 3,280,767 and 3,344,756 illustrate constructions in which set screws directly engage the corner posts to hold the shelves in position. A modified construction in which a set screw is used but does not directly engage the post is disclosed in U.S. Pat. No. 3,747,540. U.S. Pat. Nos. 3,424,111, 3,523,508, and 3,757,705 teach constructions in which set screws are eliminated and the shelves are held in place upon circumferential grooved posts by sleeves equipped with portions receivable in the grooves. Co-owned U.S. Pat. No. 3,589,746 teaches a system in which the shelves are locked in place with friction corner braces.

Co-pending co-owned application Ser. No. 576,038, filed May 9, 1975, now U.S. Pat. No. 3,964,404, discloses a shelf and corner post construction in which the outer aspect, or outer surface portion, of each post is smooth and is slidably engaged by the perimetric frame of the shelf. The inwardly-facing surface of the post is provided with a series of vertically-spaced recesses or indentations. A brace bridges the adjacent side members of the perimetric frame, the post extending through the space between the corner section of the frame and the brace. A screw, threadedly carried by the brace, urges the arms of a U-shaped clip into the indentations of the post to wedge the parts into tight locking relationship.

SUMMARY

While the construction disclosed in the aforementioned co-pending application has the advantage, among others, of providing an arrangement in which the outer aspect of each post is smooth and uninterrupted, it has been found that other highly-effective arrangements may be devised if the particular use to which such assembly is to be put does not render objectionable the provision of posts with outwardly-facing indentations. All of the constructions embodying the present invention include corner posts in which the indentations face outwardly, that is, away from the body of the shelf to which the post is coupled. Thus, where the posts are of cylindrical configuration, each indentation of the series has an arcuate portion which is directed outwardly away from the body of the shelf. It will become apparent from the following specification that each indentation may also have an inwardly-facing arcuate portion and, if desired, each indentation may extend about the complete circumference of the post; however, for most applications it is more desirable for each post to be provided with arcuate or semi-circumferential indentations along the outwardly-facing aspect of the post, the inwardly-facing post surface being left relatively smooth and uninterrupted.

The corner sections of the perimetric frame, defined by the merger of adjacent side frame members, are contoured to conform with the surface configuration of the posts against which they fit. Each corner section is provided with at least one horizontal rib or lip which seats in a selected horizontal indentation of the post. The lip or rib is drawn into the selected recess, and is retained therein, by bearing means carried by a bracket or brace which spans the adjacent side frame members of the shelf. In its simplest form, the bearing means may take the form of a screw which is threadedly carried by the brace and which projects outwardly into engagement with the post, the screw being tightened to draw the lip or rib of the corner section into interfitting engagement with the indented post. In another form of the invention, a cam element is carried by the brace and is manipulated to forceably seat the rib of the shelf's corner portion into the post's arcuate indentation. In still other forms of the invention, bearing elements in the form of clips or blocks are urged into tight engagement with the inside surfaces of the posts, each post being forced outwardly (or the corner section of the shelf being drawn inwardly) to seat the rib of the corner section into its selected indentation.

Other aspects, advantages, and objects of the invention will become apparent from the specification and drawings.

DRAWINGS

FIG. 1 is a fragmentary horizontal sectional view showing a shelf and corner post assembly embodying the present invention.

FIG. 2 is a vertical sectional view taken along line 2—2 of FIG. 1.

FIG. 3 is a perspective view illustrating a clip used in the assembly illustrated in FIGS. 1 and 2.

FIG. 4 is a fragmentary horizontal sectional view of a shelf and corner post assembly constituting a second embodiment of the present invention.

FIG. 5 is a vertical sectional view taken along line 5—5 of FIG. 4.

FIG. 6 is an enlarged perspective view illustrating the bearing block utilized in the assembly depicted in FIGS. 4 and 5.

Figure 9:
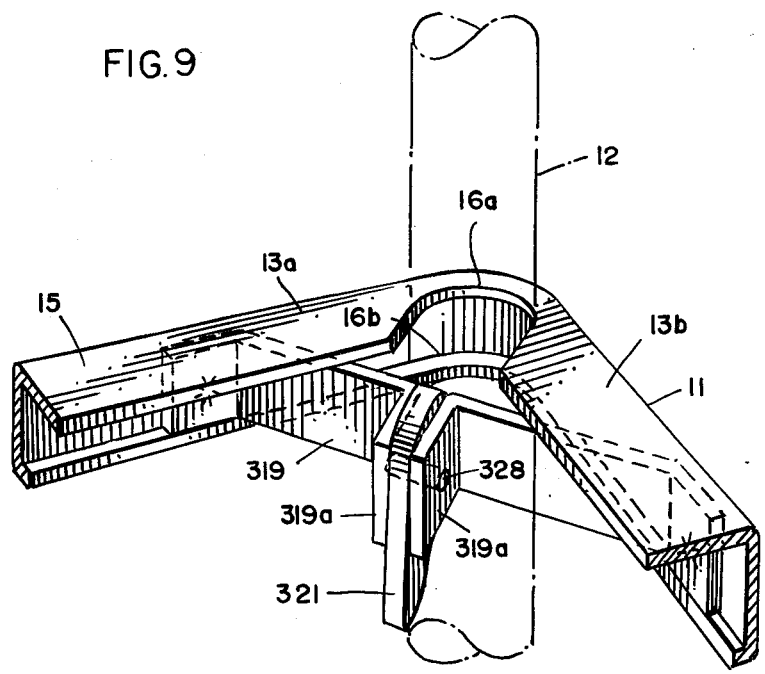
Figure 10:
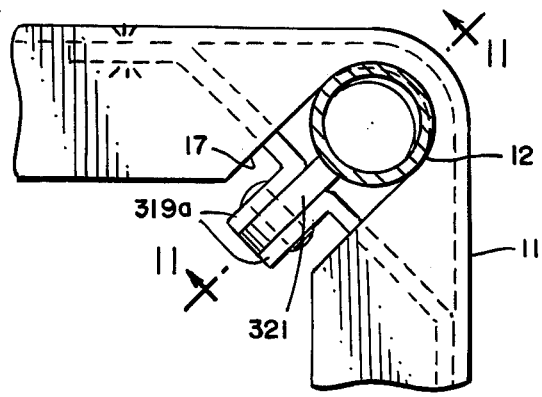
Figure 11:
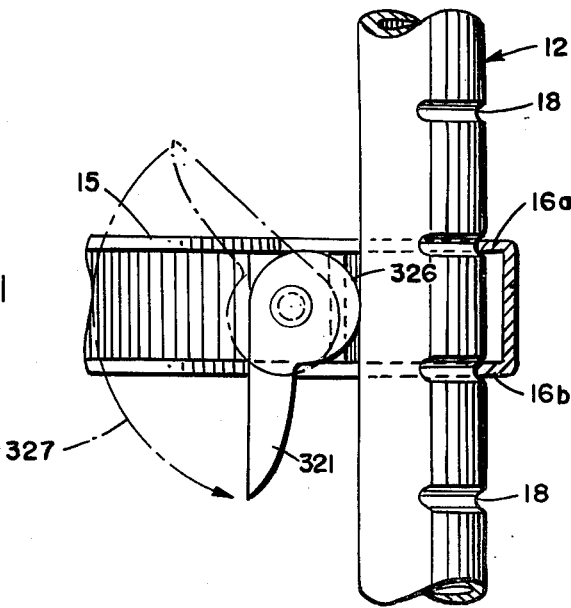

FIGS. 9-11 illustrate a shelf and corner post assembly constituting a fourth embodiment of the invention; FIG. 9 showing details in perspective of the shelf, the post being illustrated only in phantom; FIG. 10 being a fragmentary horizontal sectional view of the assembly; and FIG. 11 being a vertical sectional view taken along line 11—11 of FIG. 10.

DESCRIPTION

Referring to FIGS. 1–3 of the drawings, the numeral 10 generally designates an assembly composed of a shelf 11 and a corner post 12. It is to be understood that extraneous or duplicative structure has been omitted and, specifically, that the shelf has a plurality of corner portions each joined to a post as shown, and that in any complete unit a plurality of such shelves would be mounted on the same posts. The posts might be free standing or might constitute the frame members of a shelf cart similar to the cart illustrated in U.S. Pat. No. 3,589,746. Except for the differences shown and described herein, the shelf assembly of this invention is similar to that depicted and disclosed in the aforementioned co-pending application.

The shelf 11 includes a perimetric rectangular frame 13 defined by longitudinal frame members 13a and transverse frame members 13b. Each frame member has a generally vertical wall 14 and a top flange 15. If desired, the shelf may also have a lower flange (not shown) similar to top flange 15 but not necessarily of the same inwardly-projecting dimension as the top flange.

The side frame members 13a and 13b merge smoothly to provide an arcuate corner section 13c for the perimetric frame. As shown most clearly in FIG. 2, the corner section has at least one inwardly-projecting arcuate lip or rib. Two such ribs 16a and 16b are shown, the upper rib 16a projecting inwardly from the upper limits of side wall 14 and merging smoothly with the upper flanges 15 of the side frame members. Similarly, the lower rib 16b projects inwardly from the lower end of side wall 14, merging smoothly with a lower flange if one is provided. It is to be noted that the flanges of the side frame members terminate at the corner section to provide a recess or cutout 17 for post 12.

While the post might have other configurations, the generally cylindrical configuration illustrated in the drawing has been found particularly effective because of ease of manufacture and maintenance, and because of the strength which such a configuration contributes not only to the posts but to the assembly as a whole. In the embodiment depicted in the drawings, each post is tubular or hollow and has a series of vertically-spaced outwardly-facing indentations 18. Since the post is cylindrical, each such indentation is arcuate and extends in a horizontal plane. While only three such uniformly-spaced indentations are shown, it is to be understood that each post has a multiplicity of such indentations for use in supporting a plurality of shelves at any of a variety of selected elevations.

Each indentation or recess 18 of the cylindrical post 12 is shown to be semi-cylindrical, or slightly greater than semi-cylindrical, in horizontal extent. Alternatively, the indentations may extend the full circumference of the post; however, such a construction is unnecessary and, to the extent that indentations along the inwardly-facing aspect of the post provides surfaces for the retention of dirt and other materials, might even be considered undesirable.

Where the corner section 13c of the shelf is provided with a pair of vertically-spaced inwardly-projecting ribs 16a and 16b, the spacing between indentations 18 corresponds to the spacing between such ribs. Thus, as illustrated in FIG. 2, when the parts are assembled ribs 16a and 16b are seated within a pair of indentations 18. The inside curvature of each indentation 18 matches the curvature of the inwardly-facing edge of each rib to achieve a secure interfit between the parts.

A brace 19 bridges adjacent frame members 13a and 13b, the brace including end portions 19a which are welded or otherwise permanently secured to the inside surfaces of walls 14 and an intermediate spanning portion 19b which is spaced from the corner section 13c of the frame a distance substantially greater than the outside diameter of post 12. The intermediate portion 19b is provided with a central horizontally-extending threaded aperture 20 for receiving screw 21. The enlarged head 21a bears against a generally C-shaped clip 22, the clip in turn cooperating with the post to anchor the parts securely together. In FIG. 3 the clip is shown as having an upper arm 22a, a lower arm 22b, and a vertical connecting portion 22c. The arms are generally parallel and are provided at their free ends with arcuate bearing surfaces or edges 23 having the same curvature as the outer surface of post 12. In the embodiment depicted in the drawings, the width of each arm 22a and 22b is substantially less than the width of recess or cutout 17; however, the clip may be constructed so that the width of its arms more closely approximate the width of the cutout. Since the spacing between the arms is substantially the same as the spacing between ribs 16a and 16b, the top surface of the clip may thus be flush with the top surfaces of upper flanges 15.

It is believed evident that the clip 22 and screw 21 cooperate with the brace 19 to provide bearing means for drawing the ribs or lips of the shelf's corner section into the indentations of the post and for forceably (but releasably) securing the shelf at any of a variety of selected elevations along the post. Since the contour of bearing surfaces 23 corresponds with that of the post's outer surface, and since the shelf is secured at its selected elevation because of the seating of the ribs 16a and 16b within the indentations 18, the smooth inner surface of the post is not likely to be scored or in any way damaged by clamping engagement with the clip.

The embodiment of FIGS. 4–6 is identical to the first embodiment except for the clamping means provided by the shelf for forceably and releasably engaging the inwardly-facing surface of the post (i.e., the outer surface of the post which faces inwardly towards the body of the shelf). Like screw 21, screw 121 extends through a threaded opening 20 in the brace 19. The outwardly-facing free end of the screw 121 is provided with a shoe 122 which engages a bearing element in the form of block 123. As shown most clearly in FIG. 6, the block is provided with a recess 124 which conforms to the contour of the post's external surface. As the screw is tightened, block 123 is urged outwardly to force ribs 16a and 16b into recesses 18 in the same manner as described in conjunction with the first embodiment.

If desired, the top surface of the block may have an upwardly-stepped central portion 125 adapted to be received within the recess or cutout 17 between the top flanges of side frame members 13a and 13b, the top surface of the central portion 125 being substantially flush with the upper surface of flanges 15.

Figure 7:
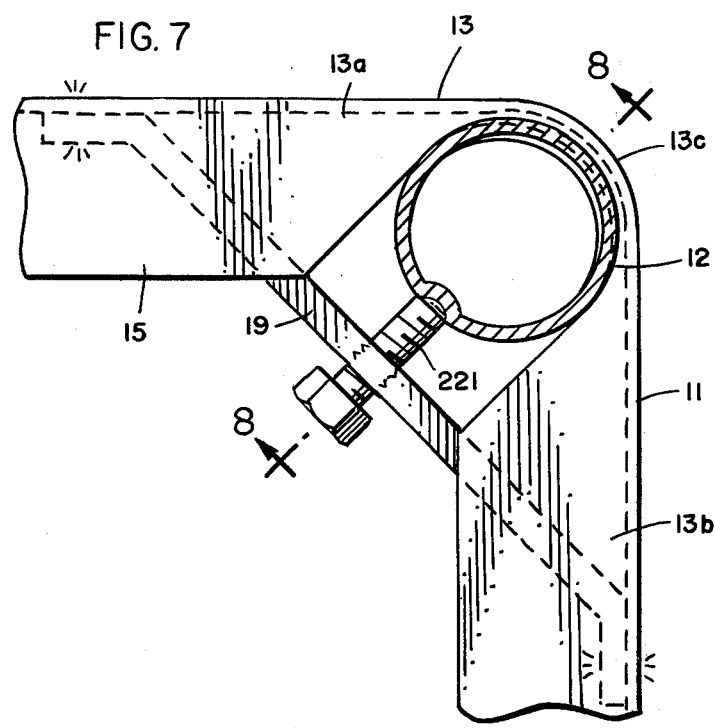
FIG. 7 is a fragmentary horizontal sectional view of a shelf and corner post assembly constituting a third embodiment of the invention.
Figure 8:
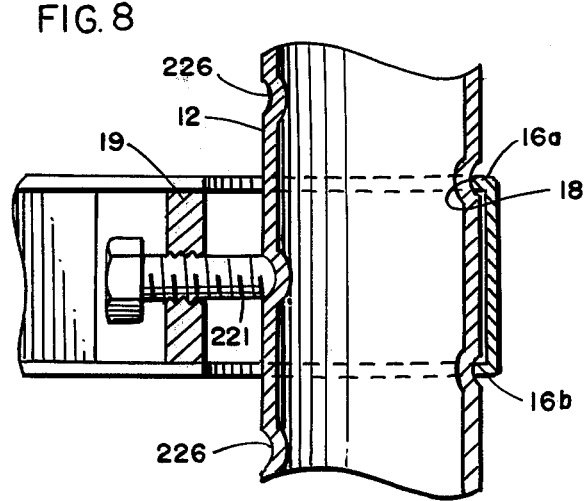
FIG. 8 is a vertical sectional view taken along line 8—8 of FIG. 7.

While the block 123 may be formed of any suitable material, a substantially inert rigid plastic such as a copolymer of acrylonitrile-butadiene-styrene is believed particularly effective. A tight sealing engagement between such a plastic block and the post, one which is incapable of marring the surface (which may be plated) of the post, may thus be achieved. The use of such a block (or of a clip 22 which substantially fills cutout 17) is particularly useful where the shelf-post assembly is to be used in food handling equipment since the block or bearing element may reduce the possibility of food entrapment, thereby facilitating cleaning and sanitizing of such equipment.

Where the advantages of such a block (or clip) are deemed unnecessary, and where possible marring of the finish of the post is not of major concern, the block (or clip) may be eliminated as shown in FIGS. 7 and 8. The post and shelf assembly of FIGS. 7–8 is identical to the construction of FIGS. 4–6 except that the block is omitted and the screw 221 bears directly against the post itself. If desired, the inwardly-facing outer surface of the post may be provided with a series of dimples or recesses 226 to guide and receive the outer end of the screw. Alternatively, the screw 221 may be provided with a shoe which is rotatable relative to the screw (similar to shoe 122 of FIGS. 4 and 5) to prevent scoring or other damage to the surface of the post.

The embodiment of FIGS. 9–11 differs from the constructions already described to the extent that the bearing means takes the form of a locking lever 321 having a cam surface 326. As the lever is pivoted downwardly in the direction indicated by arrow 327 (FIG. 11), the cam surface forceably engages the surface of the post to draw the ribs 16a and 16b of the shelf into tight seating engagement within indentations 18 of the post. Where the sliding engagement between the lever and post, which necessarily occurs during a tightening action, must be avoided, a block similar to block 123 (FIG. 6) may be interposed between the post and cam lever, such block also serving as a filler which occupies the space or recess 17 in the manner already described.

The cam lever may be pivotally supported by the bracket or brace 319 in any suitable manner. As shown in the drawings, the brace is provided with a pair of inwardly-projecting ears 319a which are apertured to support pivot pin 328 upon which the lever is pivotally supported.

While in the foregoing, several embodiments of the invention have been disclosed in considerable detail for purposes of illustration, it will be understood by those skilled in the art that many of these details may be varied without departing from the spirit and scope of the invention.

We claim:

1. A shelf and corner post combination, said post having a series of vertically-spaced indentations along at least one side thereof, said shelf including a perimetric frame having adjacent side members merging to define a post-receiving corner section, said corner section having an inside contour extending about said one side of said post and having at least one horizontal rib received in an indentation of said series, and means provided by said shelf for forceably and releasably engaging said post along a side thereof opposite from said one side for drawing and anchoring the rib of said shelf in said indentation, thereby releasably locking said shelf at a selected elevation along said post.

2. The combination of claim 1 in which said post is cylindrical in configuration, said corner section having an arcuate inside contour.

3. The combination of claim 1 in which said indentations of said series are uniformly spaced apart.

4. The combination of claim 3 in which said indentations are arcuate in configuration.

5. The combination of claim 4 in which said indentations are generally semi-cylindrical relative to said post.

6. The combination of claim 3 in which said corner section is provided with a pair of said ribs spaced vertically apart the same distance as the vertical spacing between the indentations of said series.

7. The combination of claim 1 in which said frame members of said shelf are provided with generally horizontal inwardly-extending top flanges terminating at said corner section.

8. The combination of claim 1 in which said means includes a brace extending between said adjacent side frame members, said post being disposed between said brace and said corner section.

9. The combination of claim 8 in which said means also includes bearing means carried by said brace and engaging the side of said post opposite from said one side.

10. The combination of claim 9 in which said bearing means comprises a screw extending through a threaded opening in said brace, said screw having an end portion engaging said post.

11. The combination of claim 10 in which said post has a vertical series of spaced recesses along the side thereof opposite from said one side, each of said recesses being adapted to receive said end portion of said screw.

12. The combination of claim 9 in which said bearing means comprises a cam member pivotally mounted upon said brace and movable between a locking position for drawing said rib into a selected indentation of said post and a releasing position for permitting vertical adjustment of said shelf relative to said post.

13. The combination of claim 12 in which said cam member is provided with a camming surface directly and slidably engagable with said post.

14. The combination of claim 12 in which a bearing element is interposed between said cam member and said post, said cam member being engagable with said bearing element and said bearing element being engagable with the side of said post opposite from said one side.

15. The combination of claim 9 in which said bearing means includes a screw threadedly extending through an opening in said brace, and a bearing element engaged by said screw and also bearing against the side of said post opposite from said one side.

16. The combination of claim 15 in which said side frame members of said shelf are provided with generally horizontal inwardly-extending top flanges terminating at said corner section to define a space therebetween, said bearing element substantially filling said space between said flanges.

17. The combination of claim 16 in which said bearing element has a top surface substantially flush with the top surfaces of said flanges.

18. The combination of claim 15 in which said bearing element is provided with an outwardly-facing surface having a contour conforming to the surface of said post opposite from said one side thereof.

19. The combination of claim 15 in which said bearing element comprises a C-shaped clip having an apertured intermediate portion, said screw extending through the aperture of said clip and having a head portion engaging said intermediate portion for urging said clip into engagement with said post.

20. The combination of claim 19 in which said post is cylindrical in configuration, said clip having generally horizontal arms disposed above and below said brace, said arms having arcuate end surfaces engaging said post, said arcuate end surfaces having substantially the same curvature as said post.

21. The combination of claim 15 in which said bearing element comprises a bearing block interposed between said brace and said corner section, said block being engaged by said screw and having a curved surface engaging said post.

22. The combination of claim 21 in which said post is cylindrical in configuration, said curved surface of said block having a contour conforming with the curvature of said post.

23. The combination of claim 21 in which said block is formed of rigid plastic material.

* * * * *